(12) United States Patent
Yang et al.

(10) Patent No.: US 11,314,129 B2
(45) Date of Patent: Apr. 26, 2022

(54) FRONT LIGHT SOURCE AND DISPLAY APPARATUS

(71) Applicant: BOE Technology Group Co., Ltd., Beijing (CN)

(72) Inventors: Song Yang, Beijing (CN); Ming Zhu, Beijing (CN); Shiyu Zhang, Beijing (CN); Zheng Fang, Beijing (CN); Ge Shi, Beijing (CN); Haijun Niu, Beijing (CN); Yujie Liu, Beijing (CN); Jiahui Han, Beijing (CN); Yuyao Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/963,847

(22) PCT Filed: Dec. 25, 2019

(86) PCT No.: PCT/CN2019/128411
§ 371 (c)(1),
(2) Date: Jul. 22, 2020

(87) PCT Pub. No.: WO2020/164315
PCT Pub. Date: Aug. 20, 2020

(65) Prior Publication Data
US 2021/0223632 A1    Jul. 22, 2021

(30) Foreign Application Priority Data
Feb. 13, 2019  (CN) .......................... 201910112798.1

(51) Int. Cl.
*G02F 1/1335*    (2006.01)
(52) U.S. Cl.
CPC .. *G02F 1/133616* (2021.01); *G02F 1/133524* (2013.01); *G02F 1/133553* (2013.01)

(58) Field of Classification Search
None
See application file for complete search history.

(56) References Cited

U.S. PATENT DOCUMENTS

| 6,650,382 B1 | 11/2003 | Sumida et al. |
| 2001/0024253 A1 * | 9/2001 | Ishihara ............ G02F 1/133615 349/113 |

(Continued)

FOREIGN PATENT DOCUMENTS

| CN | 1319779 A | 10/2001 |
| CN | 103499054 A | 1/2014 |

(Continued)

OTHER PUBLICATIONS

Office Action dated Dec. 31, 2019 for Chinese Patent Application No. 201910112798.1 and English Translation.

(Continued)

*Primary Examiner* — Thanh Nhan P Nguyen
(74) *Attorney, Agent, or Firm* — Ling Wu; Stephen Wang; Ling and Yang Intellectual Property

(57) ABSTRACT

Provided are a front light source and a display apparatus. The front light source is disposed on a light emitting side of a display panel. The front light source includes: a light guide member and a light emitting member disposed on a light incident side of the light guide member, the light guide member being configured to guide light emitted by the light emitting member onto the display panel; the light emitting member includes: a light source element and a quantum dot element which are disposed on a same layer, the light source element being configured to emit light of a first color, and the quantum dot element being configured to emit light of three colors including three-primary colors under excitation of the light emitted by the light source element, the first color is one of the three-primary colors.

11 Claims, 6 Drawing Sheets

(56) References Cited

U.S. PATENT DOCUMENTS

| | | | |
|---|---|---|---|
| 2001/0035927 A1 | 11/2001 | Sasagawa et al. | |
| 2014/0253844 A1* | 9/2014 | Yamamoto | G02B 6/0056 |
| | | | 349/64 |
| 2015/0103291 A1 | 4/2015 | Li | |
| 2015/0301259 A1* | 10/2015 | Park | H01L 33/502 |
| | | | 349/65 |
| 2017/0199423 A1* | 7/2017 | Cheng | G02F 1/133553 |
| 2018/0292595 A1 | 10/2018 | Lv et al. | |

FOREIGN PATENT DOCUMENTS

| | | |
|---|---|---|
| CN | 107783221 A | 3/2018 |
| CN | 208418190 U | 1/2019 |
| CN | 109655959 A | 4/2019 |

OTHER PUBLICATIONS

Office Action dated Jun. 17, 2020 for Chinese Patent Application No. 201910112798.1 and English Translation.
Office Action dated Nov. 20, 2020 for Chinese Patent Application No. 201910112798.1 and English Translation.
International Search Report for PCT/CN2019/128411 dated Mar. 20, 2020.

\* cited by examiner

FRONT LIGHT SOURCE AND DISPLAY APPARATUS

CROSS-REFERENCE TO RELATED APPLICATIONS

The present application is a U.S. National Phase Entry of International Application No. PCT/CN2019/128411 having an international filing date of Dec. 25, 2019, which claims the priority to the Chinese Patent Application No. 201910112798.1, filed to the CNIPA on Feb. 13, 2019 and entitled "A front light source and display apparatus". The above-identified applications are incorporated into this application by reference in their entirety.

TECHNICAL FIELD

Embodiments of the present application relate to, but are not limited to, the field of display technology, in particular to a front light source and a display apparatus.

BACKGROUND

A reflective display apparatus is capable of utilizing ambient light as an illumination source to display images. Compared with a traditional transmissive display apparatus, the reflective display apparatus has the advantages such as soft light, power saving, and better display effect in the outdoors, and therefore has attracted more and more attention.

In order to obtain a relatively good display effect in an environment with weak ambient light or in a dark room environment, a front light source is generally added to the reflective display apparatus to assist the display apparatus in displaying. However, the front light source has poor optical properties, resulting in poor display effect.

SUMMARY

The following is a summary of the subject matter described in detail in the present application. This summary is not intended to limit the protection scope of the claims.

In an aspect, the present application provides a front light source, disposed on a light emitting side of a display panel, the front light source including: a light guide member and a light emitting member disposed on a light incident side of the light guide member, the light guide member being configured to guide light emitted by the light emitting member onto the display panel; the light emitting member including: a light source element and a quantum dot element which are disposed on a same layer, the light source element being configured to emit light of a first color, and the quantum dot element being configured to emit light of three colors including three-primary colors under excitation of the light emitted by the light source element, wherein the first color is one of the three-primary colors.

In some possible implementations, the quantum dot element is located on a side of the light source element close to the light guide member.

In some possible implementations, the light source element includes a light source, and the light source includes a light emitting diode or a micro light emitting diode.

In some possible implementations, the light source element may further include a reflective layer configured to reflect light emitted by the light source and is not incident to the quantum dot element.

In some possible implementations, the quantum dot element includes: a first quantum dot and a second quantum dot; wherein the first quantum dot is configured to emit light of a second color under excitation of light of the first color, and the second quantum dot is configured to emit light of a third color under excitation of light of the first color, the second color and the third color being colors of the three-primary colors respectively other than the first color.

In some possible implementations, the light emitting member further includes: a photonic crystal element configured to half-transmit and half-reflect light of the first color and transmit light of the second color and light of the third color.

In some possible implementations, the photonic crystal element is disposed on the same layer as the quantum dot element and is located on a side of the quantum dot element close to the light guide member.

In some possible implementations, the photonic crystal element includes: a transparent substrate and photonic crystal layers arranged in an array; the photonic crystal layer being located on a side of the transparent substrate away from the light guide member.

In some possible implementations, a manufacturing material of the photonic crystal layer has a higher refractive index than a manufacturing material of the transparent substrate.

In some possible implementations, the light guide member is provided, on a side close to the display panel, with grooves arranged in an array, the groove being configured to extract light guided by the light guide member and direct the light to the display panel.

In some possible implementations, the display panel includes sub-pixels arranged in an array, and the grooves are in one-to-one correspondence with the sub-pixels; and the groove is configured to extract light of the same color as a corresponding sub-pixel and direct the extracted light to the corresponding sub-pixel.

In some possible implementations, grooves corresponding to sub-pixels of different colors are different in at least one of thickness, width and period.

In another aspect, the present application further provides a display apparatus, including: a display panel and the front light source described above.

In some possible implementations, the display apparatus may further include a light source adhesive layer configured to adhere the front light source with the display panel.

Other aspects will become apparent upon reading and understanding the accompanying drawings and the detailed description.

BRIEF DESCRIPTION OF DRAWINGS

Accompanying drawings are used to provide a further understanding of technical solutions of the present application and form a part of the specification. Together with embodiments of the present application, they are used to explain the technical solutions of the present application and do not constitute a limitation on the technical solutions of the present application.

DETAILED DESCRIPTION

The embodiments of the present application will be described below in detail with reference to the accompanying drawings. The embodiments in the present application and features in the embodiments can be combined with each other in any way if there is no conflict.

Unless otherwise defined, technical terms or scientific terms used in the present application shall have common meanings as construed by those of ordinary skills in the art to which the present application pertains. The words "first", "second" and the like used in the present application do not represent any order, quantity or importance, but are merely used to distinguish among different components. Words such as "including", "comprising" or the like mean that elements or articles preceding the words cover elements or articles listed after the words and their equivalents, and do not exclude other elements or articles. Terms such as "connect", "link" or the like are not limited to physical or mechanical connections, but may include electrical connections, whether direct or indirect. "Up", "down", "left", "right", etc. are only used to represent a relative position relationship that may change accordingly when an absolute position of an object being described changes.

Figure 1:
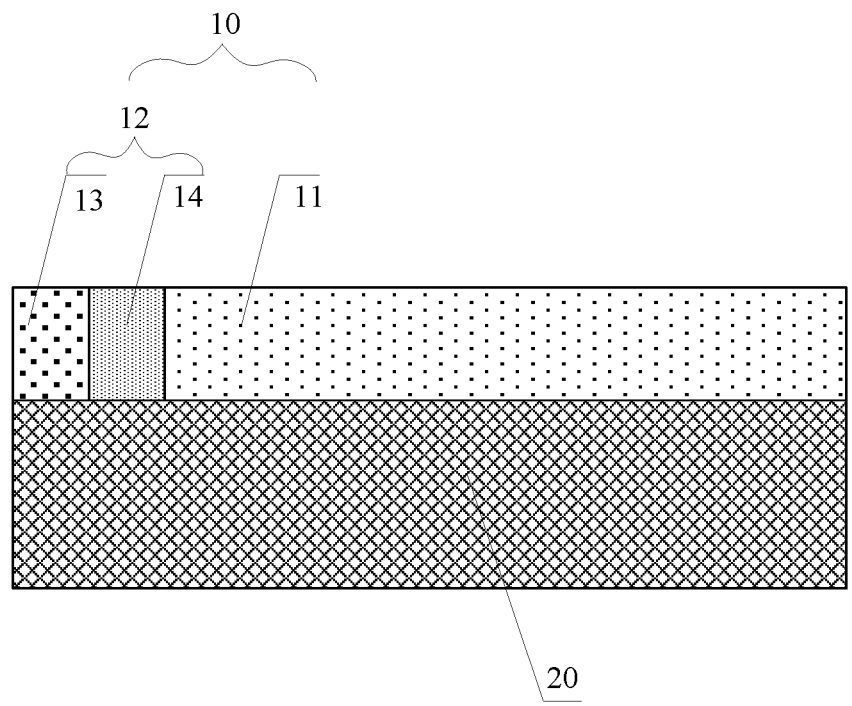
FIG. 1 is a schematic structural view of a front light source according to an embodiment of the present application.

FIG. 1 is a schematic structural view of a front light source according to an embodiment of the present application. As shown in FIG. 1, the front light source 10 according to an embodiment of the present application is disposed on a light emitting side of a display panel 20. The front light source 10 includes: a light guide member 11 and a light emitting member 12 disposed on a light incident side of the light guide member 11. The light guide member 11 is configured to guide the light emitted by the light emitting member 12 onto the display panel 20.

The light emitting member 12 may include: a light source element 13 and a quantum dot element 14 which are disposed on the same layer. The light source element 13 is configured to emit light of a first color, and the quantum dot element 14 is configured to emit light of three colors including three-primary colors under the excitation of light emitted by the light source element 13.

The first color is one of the three-primary colors, that is, the first color may be one of red, blue and green.

The light source element and the quantum dot element being disposed on the same layer means that the light source element and the quantum dot element are in direct contact with the display panel, and an orthographic projection of the light source element on the display panel and an orthographic projection of the quantum dot element on the display panel do not have an overlapping area.

The display panel in this embodiment is a reflective display panel. The reflective display panel may be a reflective liquid crystal display panel, an E-ink display panel or a Clear-ink display panel, or may be other reflective display panels, which is not limited in any way in the embodiments of the present application.

The reflective display panel may be provided with a reflective member configured to reflect ambient light or the light emitted by the front light source.

The light guide member 11 may be a light guide plate, a light guide bar or other components capable of guiding light, which is not limited in any way in the embodiments of the present application.

A refractive index of the light guide member 11 may be 1.3 to 1.7, for example, the refractive index of the light guide member 11 may be 1.5.

A thickness of the light guide member 11 may be 50 microns to 800 microns.

The light guide member 11 may be made of an optically transparent material such as polymethylmethacrylate (PMMA), silica ($SiO_2$), epoxy resin, acrylic or silica gel, which is not limited in any way in the embodiments of the present application. The light guide member 11 is transparent and is capable of guiding light emitted by the light emitting member onto the entire surface of the display panel.

In the embodiments of the present application, the refractive index, the manufacturing material, the thickness, etc. of the light guide member 11 are designed to better ensure that most of the light enters the display panel, thereby improving the display effect of the display panel.

The front light source in an embodiment of the present application may adopt a light emitting scheme in which a monochromatic light source, quantum dots and a light guide plate are combined. Quantum dots (QDs) generally refer to semiconductor nanotransistors having a diameter ranging from 1 nm to 10 nm, typically semiconductor nanoparticles composed of Group II-VI or Group III-V elements. Due to the quantum confinement effect, quantum dots generally exhibit unique physical and chemical properties that differ from those of corresponding bulk phase materials and other molecular materials. After stimulated by light with certain energy, quantum dots can emit fluorescence, the wavelength of the fluorescence can be adjusted by changing the size of quantum dots, and the quantum dots have good optical properties such as wide and continuous absorption spectrum, narrow and symmetrical emission spectrum, good light stability, and high luminous efficiency.

The light source element 13 may emit blue light, or may emit red light or green light. In an exemplary embodiment, when the light source element emits blue light, the quantum dot element emits red light, green light and blue light under the excitation of the blue light; when the light source element emits red light, the quantum dot element emits red light, green light and blue light under the excitation of the red light; and when the light source element emits green light, the quantum dot element emits red light, green light and blue light under the excitation of the green light. When the light source element emits blue light and the quantum dot element emits red light, green light and blue light under the excitation of the blue light, the front light source can realize high color gamut emission.

The light emitting member 12 may be bonded to the light incident side of the light guide member 11, for example, the light emitting member 12 may be adhered to the light incident side of the light guide member 11 by an adhesive.

The front light source according to an embodiment of the present application is disposed on the light emitting side of the display panel. The front light source includes: a light guide member and a light emitting member disposed on a light incident side of the light guide member. The light guide member is configured to guide light emitted by the light emitting member onto the display panel. The light emitting member includes: a light source element and a quantum dot element that are disposed on the same layer. The light source element is configured to emit light of a first color, and the quantum dot element is configured to emit light of three colors including three-primary colors under the excitation of light emitted by the light source element, and the first color is one of the three-primary colors. The technical solution provided by the present application improves the optical properties of the front light source by combining the light guide member, the light source element and the quantum dot element, thereby achieving a better display effect.

In order to ensure normal light emission of the front light source, as shown in FIG. 1, in an exemplary embodiment, the quantum dot element 14 is located on a side of the light source element 13 close to the light guide member 11.

Figure 2A:
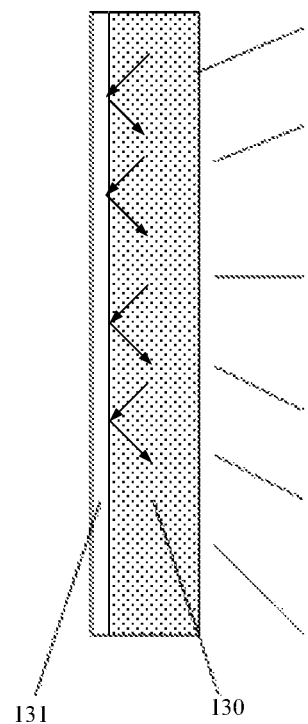
FIG. 2A is a schematic structural view of a light source element.
Figure 2B:
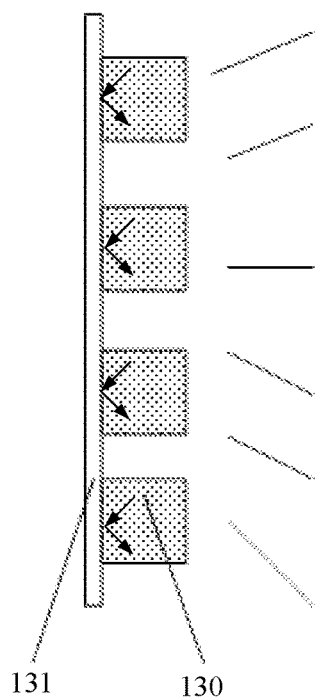
FIG. 2B is another schematic structural view of the light source element.
Figure 2C:
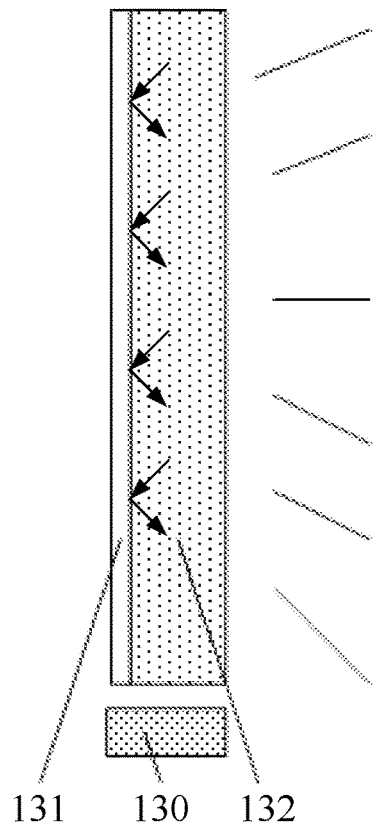
FIG. 2C is a further schematic structural view of the light source element.

FIG. 2A is a schematic structural view of the light source element, FIG. 2B is another schematic structural view of the light source element, and FIG. 2C is a further schematic structural view of the light source element. As shown in FIGS. 2A to 2C, the light source element 13 in the front light source according to an embodiment of the present application includes a light source 130.

The light source 130 in this embodiment may be a monochromatic light source. The light source 130 includes a Light Emitting Diode (LED) or a micro light emitting diode.

The light source 130 may be a bar-shaped light source, or may be a plurality of individual light sources arranged in a column direction, or may be a combination of an individual light source and a light guide bar. FIG. 2A illustrates a bar-shaped light source as an example, FIG. 2B illustrates a plurality of individual light sources arranged in a column direction as an example, and FIG. 2C illustrates a combination of an individual light source and a light guide bar 132 as an example. The light source element according to an embodiment of the present application may be a light source in other forms that emits monochromatic light, which is not limited in any way in the embodiments of the present application.

As shown in FIGS. 2A to 2C, the light source element 13 in an embodiment of the present application may further include a reflective layer 131 configured to reflect light of the light source 130 that is not incident to the quantum dot element 14.

The manufacturing material of the reflective layer 131 may be silver, aluminum or other materials capable of reflecting light, so long as it has a relative high reflectivity, which is not limited in any way in the embodiments of the present application.

In this embodiment, the light utilization ratio of the light source element is improved by providing the reflective layer 131 in the light source element 13, and the display effect of the front light source is further improved.

In this embodiment, the quantum dot element 14 may include a first quantum dot and a second quantum dot. The first quantum dot is configured to emit light of the second color under the excitation of light of the first color, and the second quantum dot is configured to emit light of the third color under the excitation of light of the first color.

The second color and the third color are the colors of the three-primary colors respectively other than the first color.

In an exemplary embodiment, if the light source element emits blue light, the first quantum dot is made of a quantum dot material that emits red light under the excitation of blue light, and the second quantum dot is made of a quantum dot material that emits green light under the excitation of blue light; if the light source element emits red light, the first quantum dot is made of a quantum dot material that emits blue light under the excitation of red light, and the second quantum dot is made of a quantum dot material that emits green light under the excitation of red light; and if the light source element emits green light, the first quantum dot is made of a quantum dot material that emits blue light under the excitation of green light, and the second quantum dot is made of a quantum dot material that emits red light under the excitation of green light.

In this embodiment, the first quantum dot and the second quantum dot may be mixed in a certain ratio and distributed in the quantum dot element.

Figure 3:
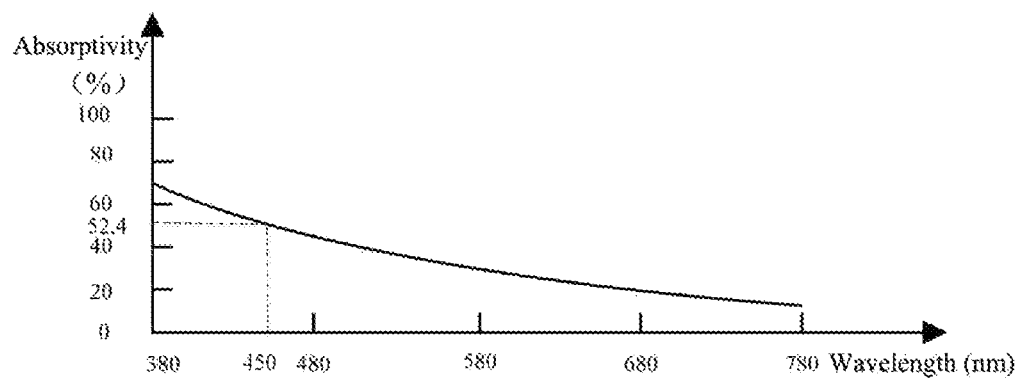
FIG. 3 is a schematic diagram showing a correlation between light wavelength and quantum dot absorptivity.

In this embodiment, in an example where the light source element emits blue light, because the conversion efficiency of the first quantum dot and the second quantum dot to blue light is only 40%, and if no processing is performed on the blue light, light emitted by the quantum dot element 14 will directly enter the light guide member 11, resulting in an inappropriate ratio between blue light and the light consisted of red and green light in the light guide member 11. FIG. 3 is a schematic diagram showing a correlation between light wavelength and absorptivity of the quantum dots for blue light. When the thickness of the quantum dots is 2 um, the absorptivity of the quantum dots for blue light at a wavelength of 450 nm is 52.4%, and in this case, the emitted red and green light is 21.0%, and the transmitted blue light is 47.6%, resulting in non-uniformity of light of the three colors entering the light guide member.

Figure 4:
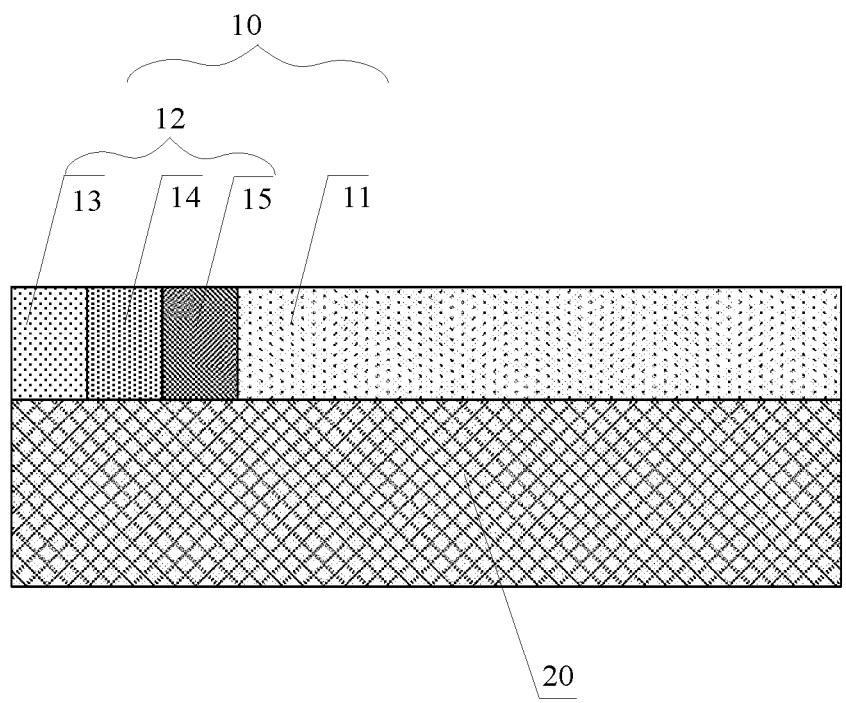
FIG. 4 is another schematic structural view of the front light source according to an embodiment of the present application.

In order to ensure uniformity of the light of the three colors entering the light guide member, in an embodiment of the present application, a photonic crystal element may be provided in the front light source. FIG. 4 is another schematic structural view of the front light source according to an embodiment of the present application. As shown in FIG. 4, the light emitting member 12 in the front light source according to an embodiment of the present application further includes a photonic crystal element 15.

The photonic crystal element 15 is configured to half-transmit and half-reflect light of the first color and also configured to transmit light of the second color and light of the third color.

As shown in FIG. 4, the photonic crystal element 15 may be disposed on the same layer as the quantum dot element 14 and located on one side of the quantum dot element 14 close to the light guide member 11.

The photonic crystal element and the quantum dot element being disposed on the same layer means that the photonic crystal element and the quantum dot element are in direct contact with the display panel, and an orthographic projection of the photonic crystal element on the display panel and an orthographic projection of the quantum dot element on the display panel do not have an overlapping area.

Figure 5:
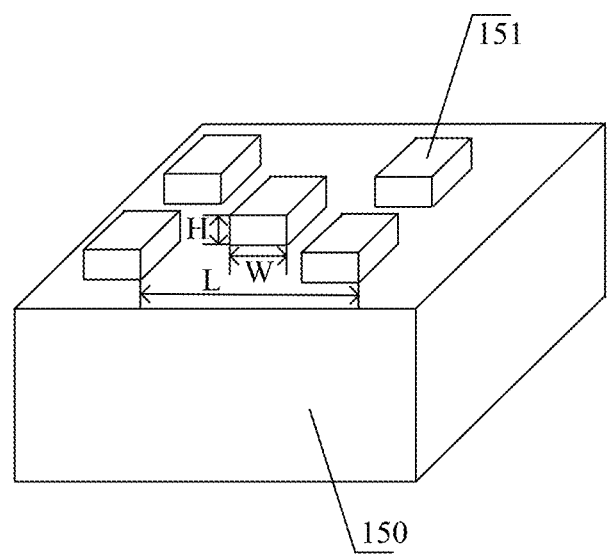
FIG. 5 is a schematic structural view of a photonic crystal element according to an embodiment of the present application.

FIG. 5 is a schematic structural view of the photonic crystal element according to an embodiment of the present application. As shown in FIG. 5, the photonic crystal element includes: a transparent substrate 150 and photonic crystal structures 151 arranged in an array, the photonic crystal structures 151 being located on one side of the transparent substrate 150 away from the light guide member.

The refractive index of the manufacturing material of the photonic crystal structure 151 may be higher than the refractive index of the manufacturing material of the transparent substrate 150.

The manufacturing material of the photonic crystal structure 151 may be silicon, and its period L, height H, and width W may be determined according to actual conditions, which are not specifically limited in the embodiments of the present application.

Figure 6:
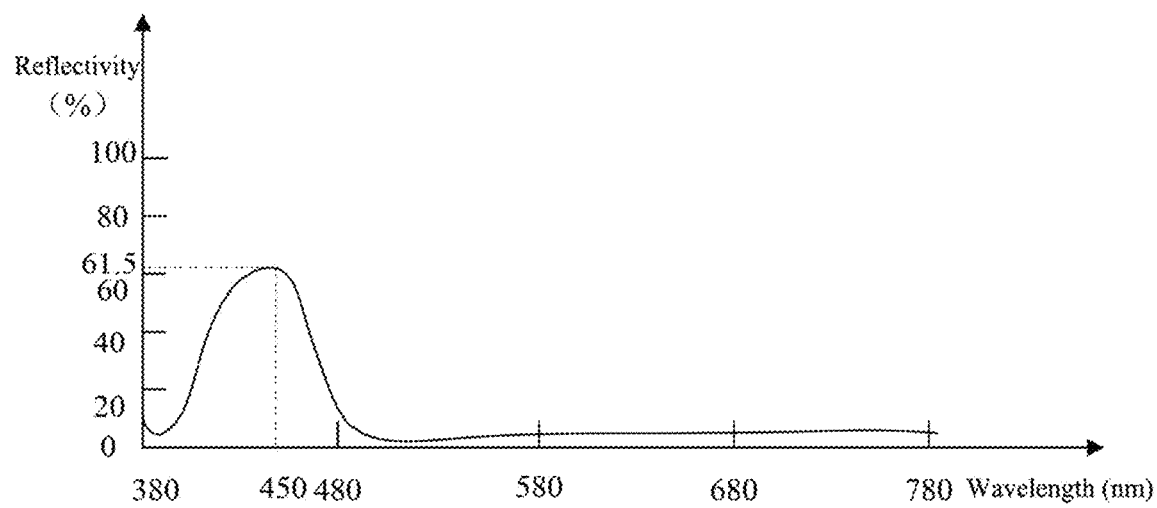
FIG. 6 is a schematic diagram showing reflectivity of the photonic crystal element for blue light as the wavelength of the light changes according to an embodiment of the present application.

FIG. 6 is a schematic diagram showing reflectivity of the photonic crystal element for blue light as the wavelength of the light changes according to an embodiment of the present application. FIG. 6 is a schematic diagram showing reflectivity of the photonic crystal element for blue light as the wavelength of the light changes, in an example where the photonic crystal structure has a period L of 220 nm, a width W of 90 nm, and a height of 80 nm, and is made of silicon. As shown in FIG. 6, the reflectivity of the photonic crystal element for blue light at 450 nm is 61.5%. By calculation, in this case, the transmittance of blue light is 18.3% and the transmittance of red and green light is 27.1%. As can be seen from the above analysis, the photonic crystal element according to an embodiment of the present application can realize a balanced emission of red, green and blue light.

In the embodiment of the present application, a photonic crystal element is provided to implement half-transmission and half-reflection of light of the first color, and the photonic crystal element is also configured to transmit light of the second color and light of the third color, thus, light incident to the light guide member can be balanced, thereby achieving uniform emission of red, green and blue light, and cyclic utilization of light, which increases the utilization rate of the quantum dots.

Figure 7:
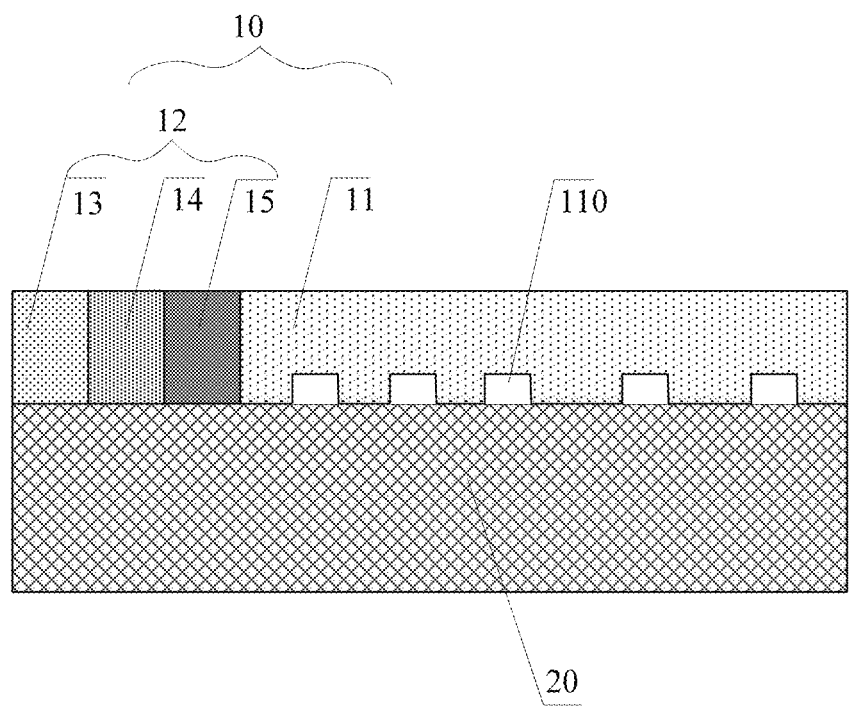
FIG. 7 is a further schematic structural view of the front light source according to an embodiment of the present application.

FIG. 7 is a further schematic structural view of the front light source according to an embodiment of the present application. As shown in FIG. 7, grooves 110 arranged in an array are provided on one side of the light guide member 11 close to the display panel 20 according to an embodiment of the present application.

The groove 110 is configured to obtain the light guided by the light guide member 11 and then direct the light to the display panel.

In this embodiment, the grooves arranged in an array on one side of the light guide member 11 close to the display panel 20 are in principle equivalent to a diffraction grating to achieve extraction of the three primary colors.

The width, thickness and period of the grooves determine the color and collimation of the emitted light. The embodiments of the present application do not specifically limit the size of the grooves, which may be determined according to the actual situation.

In this embodiment, since light emitted from the light emitting member has good monochromaticity, the provision of the grooves equivalent to gratings in the light guide member in this embodiment can realize separate light extraction for red, green and blue light.

Figure 8:
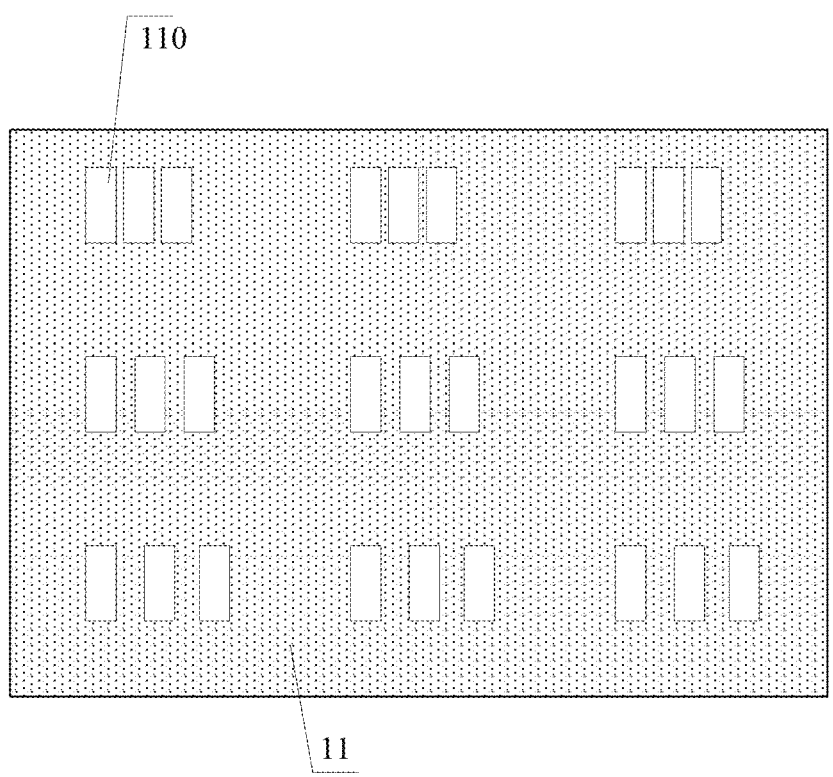
FIG. 8 is a bottom view of a light guide component according to an embodiment of the present application.

FIG. 8 is a bottom view of the light guide member according to an embodiment of the present application. As shown in FIG. 8, the display panel includes sub-pixels arranged in an array. The grooves 110 are in one-to-one correspondence with the sub-pixels.

The groove 110 is configured to extract light of the same color as a corresponding sub-pixel and enable the extracted light to go to the corresponding sub-pixel. Grooves corresponding to sub-pixels of different colors are different in at least one of thickness, width and period.

In the embodiment of the present application, the first-order diffraction characteristic of a diffraction grating is utilized to construct a sub-wavelength grating, and three types of grooves are provided, thus, three types of light can be extracted. In addition, the efficiency of light extraction remains constant during light propagation, resulting in a problem in uniformity. Thus, in this embodiment, the grooves are non-uniformly arranged to realize uniform light extraction.

An embodiment of the present application further provides a display apparatus, including a display panel and a front light source.

The front light source is a front light source provided according to the preceding embodiments, and the implementation principle and effect will not be repeated here.

The display panel in this embodiment is a reflective display panel, and the reflective display panel may be a reflective liquid crystal display panel, an E-ink display panel or a Clear-ink display panel, or may be other reflective display panels, which is not limited in any way in the embodiments of the present application.

The display panel is provided with a reflective member configured to reflect ambient light or the light emitted by the front light source. The reflective member may include a reflective surface or a reflective sheet. The reflective member may be integrally formed with the display panel, or the reflective member may be formed independently from the display panel and bonded to the display panel by bonding or the like, which is not limited in any way in the embodiments of the present application.

Figure 9:
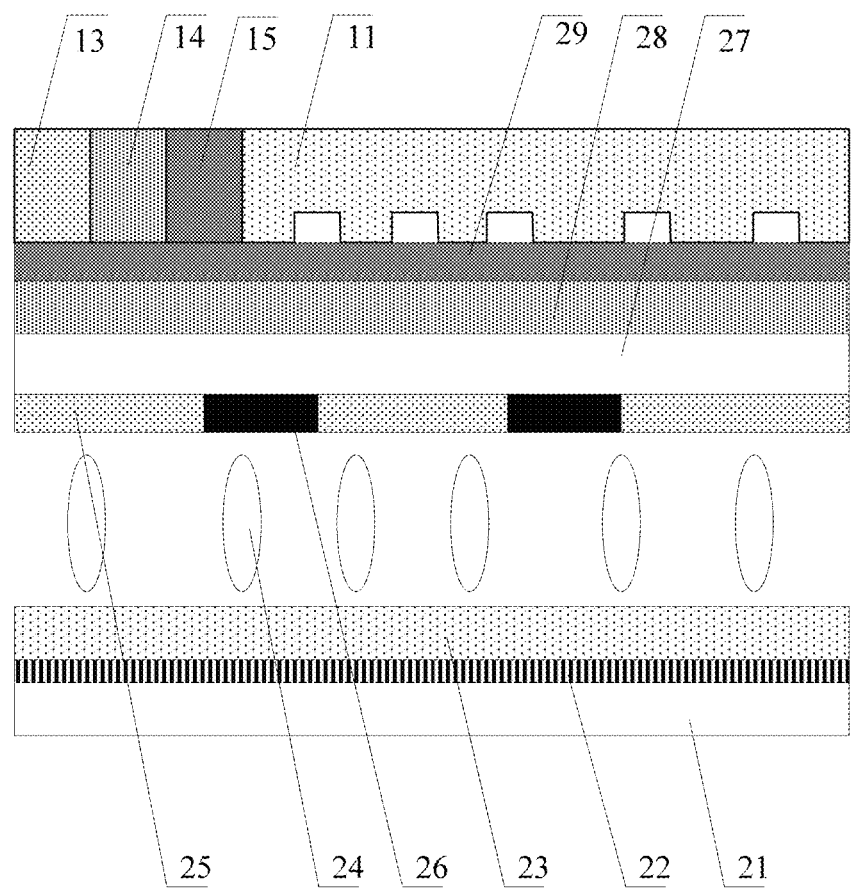
FIG. 9 is a schematic structural view of a display apparatus according to an embodiment of the present application.

FIG. 9 is a schematic structural view of a display apparatus according to an embodiment of the present application. In FIG. 9, the display panel is illustrated by taking a reflective liquid crystal display panel as an example. As shown in FIG. 9, the display panel includes: a first substrate 21, a reflective member 22 disposed on the first substrate 21, a thin film transistor array 23 disposed on the reflective member 22, a liquid crystal layer 24, a color filter 25, a black matrix layer 26, a second substrate 27, a circular polarizer 28 and a diffusion sheet 29. The front light source includes a light guide member 11, a light source element 13, a quantum dot element 14, and a photonic crystal element 15 disposed on the same layer.

The display apparatus may be any product or component with a display function, such as a mobile phone, a tablet computer, a television, a display, a notebook computer, a digital photo frame, a navigator, etc. Other essential components of the display apparatus as understood by those of ordinary skills in the art, which are not described in detail here and also should not be used as limitations on the present application.

The display apparatus according to an embodiment of the present application may further include a light source adhesive layer configured to adhere the front light source with the display panel.

The light source adhesive layer may be formed from an optical clear adhesive material.

The accompanying drawings of the present application only refer to structures involved in the embodiments of the present application, and other structures may refer to general designs. Without conflict, the embodiments of the present application and the features of the embodiments may be combined with each other to obtain new embodiments.

Those of ordinary skills in the art will appreciate that modifications or equivalent substitutions may be made to the technical solutions of the present application without departing from the spirit and scope of the technical solutions of the present application, all of which should be contained within the scope of the claims of the present application.

What is claimed is:

1. A front light source, disposed on a light emitting side of a display panel, the front light source comprising: a light guide member and a light emitting member disposed on a light incident side of the light guide member, the light guide member being configured to guide light emitted by the light emitting member onto the display panel;

the light emitting member comprising: a light source element and a quantum dot element which are disposed on a same layer, the light source element being configured to emit light of a first color, and the quantum dot element being configured to emit light of three colors including three-primary colors under excitation of the light emitted by the light source element, wherein the first color is one of the three-primary colors, wherein the light guide member is provided, on a side close to the display panel, with grooves arranged in an array;

the grooves are configured to extract light guided by the light guide member and direct the light to the display panel, wherein the display panel comprises sub-pixels arranged in an array, and the grooves are in one-to-one correspondence with the sub-pixels;

each of the grooves is configured to extract light of a same color as a corresponding sub-pixel and direct the extracted light to the corresponding sub-pixel.

2. The front light source according to claim 1, wherein the quantum dot element is located on a side of the light source element close to the light guide member.

3. The front light source according to claim 1, wherein the light source element comprises a light source;

the light source comprises a light emitting diode or a micro light emitting diode.

4. The front light source according to claim 3, wherein the quantum dot element comprises: a first quantum dot and a second quantum dot;

wherein the first quantum dot is configured to emit light of a second color under excitation of light of the first color, and the second quantum dot is configured to emit light of a third color under excitation of light of the first color, the second color and the third color being colors of the three-primary colors respectively other than the first color.

5. The front light source according to claim 4, wherein the light emitting member further comprises: a photonic crystal element;

the photonic crystal element is configured to half-transmit and half-reflect light of the first color and transmit light of the second color and light of the third color.

6. The front light source according to claim 5, wherein the photonic crystal element is disposed on a same layer as the quantum dot element and is located on a side of the quantum dot element close to the light guide member.

7. The front light source according to claim 6, wherein the photonic crystal element comprises: a transparent substrate and photonic crystal layers arranged in an array;

the photonic crystal layer is located on a side of the transparent substrate away from the light guide member.

8. The front light source according to claim 7, wherein a manufacturing material of the photonic crystal layer has a higher refractive index than a manufacturing material of the transparent substrate.

9. The front light source according to claim 1, wherein the grooves corresponding to sub-pixels of different colors are different in at least one of a group consisting of thickness, width and period.

10. A display apparatus, comprising: a display panel and the front light source according to claim 1.

11. The display apparatus according to claim 10, wherein the display apparatus further comprises a light source adhesive layer;

the light source adhesive layer is configured to adhere the front light source with the display panel.

* * * * *